United States Patent
Schneidewend et al.

(10) Patent No.: US 8,286,207 B1
(45) Date of Patent: Oct. 9, 2012

(54) SYSTEM FOR PROCESSING PROGRAMS AND SYSTEM TIMING INFORMATION DERIVED FROM MULTIPLE BROADCAST SOURCES

(75) Inventors: Daniel Richard Schneidewend, Fishers, IN (US); Aaron Hal Dinwiddie, Fishers, IN (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 09/190,309

(22) Filed: Nov. 12, 1998

Related U.S. Application Data

(60) Provisional application No. 60/092,616, filed on Jul. 13, 1998.

(51) Int. Cl.
G06F 3/00 (2006.01)
G06F 13/00 (2006.01)
H04N 5/445 (2011.01)

(52) U.S. Cl. ............... 725/58; 725/38; 725/39; 725/40; 725/44; 725/48; 725/68; 725/100; 725/139; 725/151; 368/46; 368/47; 368/48; 348/553; 348/500; 348/460; 375/327

(58) Field of Classification Search .................... 725/38, 725/39, 40, 44, 48, 68, 100, 139, 151, 58; 368/46, 47, 52; 348/553, 500, 460; 375/327
See application file for complete search history.

(56) References Cited

U.S. PATENT DOCUMENTS

| 4,323,922 A |   | 4/1982  | den Toonder et al. |          |
|-------------|---|---------|--------------------|----------|
| 4,631,601 A |   | 12/1986 | Brugliera et al.   |          |
| 4,706,121 A | * | 11/1987 | Young              | 348/27   |
| 4,908,707 A |   | 3/1990  | Kinghorn           |          |
| 4,908,713 A |   | 3/1990  | Levine             |          |
| 4,930,160 A |   | 5/1990  | Vogel              |          |
| 4,977,455 A |   | 12/1990 | Young              |          |
| 4,993,003 A | * | 2/1991  | Fechner et al.     | 368/47   |
| 5,038,211 A |   | 8/1991  | Hallenbeck         |          |
| 5,210,611 A | * | 5/1993  | Yee et al.         | 348/473  |
| 5,307,173 A |   | 4/1994  | Yuen et al.        |          |
| 5,334,975 A | * | 8/1994  | Wachob et al.      | 340/825.21 |

(Continued)

FOREIGN PATENT DOCUMENTS

DE 19803319 8/1998

(Continued)

OTHER PUBLICATIONS

ATSC, Program and System Information Protocol for Terrestrial Broadcast and Cable, Dec. 23, 1997, Doc. A/65, All Pages.*

(Continued)

*Primary Examiner* — Jason Salce

(74) *Attorney, Agent, or Firm* — Robert D. Shedd; Paul P. Kiel; Brian J. Dorini

(57) ABSTRACT

A system for initiating scheduled program processing functions such as program display, recording or playback, derives a time clock based on a current time reference indication produced by a particular broadcast source. The derived time clock is used in initiating scheduled processing functions for programs derived from the particular broadcast source and time clocks derived from sources other than the particular broadcast source are disregarded. The system displays a second time clock different to the derived time clock. In addition, the system forms a composite program guide from data from multiple broadcast sources to associate current time reference indications with their corresponding broadcast sources.

15 Claims, 5 Drawing Sheets

U.S. PATENT DOCUMENTS

| | | | |
|---|---|---|---|
| 5,410,344 A | | 4/1995 | Graves et al. |
| 5,465,385 A | * | 11/1995 | Ohga et al. ........................ 725/58 |
| 5,477,263 A | * | 12/1995 | O'Callaghan et al. ......... 725/102 |
| 5,479,266 A | * | 12/1995 | Young et al. ..................... 386/83 |
| 5,479,268 A | * | 12/1995 | Young et al. ..................... 386/83 |
| 5,485,518 A | | 1/1996 | Hunter et al. |
| 5,541,738 A | * | 7/1996 | Mankovitz ....................... 386/83 |
| 5,544,161 A | * | 8/1996 | Bigham et al. ................. 370/397 |
| 5,550,575 A | | 8/1996 | West et al. |
| 5,559,548 A | | 9/1996 | Davis et al. |
| 5,559,550 A | * | 9/1996 | Mankovitz ....................... 725/41 |
| 5,561,461 A | * | 10/1996 | Landis et al. ................... 348/725 |
| 5,576,755 A | * | 11/1996 | Davis et al. .................... 348/906 |
| 5,583,576 A | | 12/1996 | Perlman et al. |
| 5,600,378 A | * | 2/1997 | Wasilewski ..................... 348/461 |
| 5,617,146 A | * | 4/1997 | Duffield et al. ................ 348/460 |
| 5,619,274 A | * | 4/1997 | Roop et al. ..................... 348/461 |
| 5,625,406 A | | 4/1997 | Newberry et al. |
| 5,646,675 A | * | 7/1997 | Copriviza et al. ............... 725/20 |
| 5,666,645 A | * | 9/1997 | Thomas et al. ................ 348/723 |
| 5,668,915 A | * | 9/1997 | Baik et al. ........................ 386/46 |
| 5,677,895 A | * | 10/1997 | Mankovitz ........................ 368/10 |
| 5,684,525 A | * | 11/1997 | Klosterman ..................... 725/48 |
| 5,686,954 A | * | 11/1997 | Yoshinobu et al. ............. 348/460 |
| 5,699,107 A | * | 12/1997 | Lawler et al. .................... 725/58 |
| 5,751,335 A | | 5/1998 | Shintani |
| 5,754,651 A | | 5/1998 | Blatter et al. |
| 5,757,417 A | | 5/1998 | Aras et al. |
| 5,758,257 A | | 5/1998 | Herz et al. |
| 5,784,119 A | | 7/1998 | Noda et al. |
| 5,790,543 A | * | 8/1998 | Cloutier ......................... 370/252 |
| 5,801,753 A | * | 9/1998 | Eyer et al. ...................... 348/473 |
| 5,801,787 A | * | 9/1998 | Schein et al. .................... 725/43 |
| 5,805,530 A | * | 9/1998 | Youngberg ...................... 368/47 |
| 5,808,694 A | * | 9/1998 | Usui et al. ....................... 725/49 |
| 5,812,205 A | | 9/1998 | Milnes et al. |
| 5,812,209 A | | 9/1998 | Nishigaki |
| 5,859,949 A | * | 1/1999 | Yanagihara ...................... 386/68 |
| 5,867,207 A | * | 2/1999 | Chaney et al. ................... 725/54 |
| 5,898,695 A | | 4/1999 | Fujii et al. .................... 348/423.1 |
| 5,917,830 A | | 6/1999 | Chen et al. ..................... 370/487 |
| 5,917,873 A | | 6/1999 | Shiomoto et al. ............. 375/376 |
| 5,923,362 A | * | 7/1999 | Klosterman ................... 348/569 |
| 5,963,557 A | * | 10/1999 | Eng ................................. 370/432 |
| 5,982,411 A | * | 11/1999 | Eyer et al. ...................... 348/569 |
| 5,990,883 A | * | 11/1999 | Byrne et al. ................... 345/721 |
| 5,995,092 A | * | 11/1999 | Yuen et al. ..................... 345/716 |
| 6,031,577 A | * | 2/2000 | Ozkan et al. ................... 348/465 |
| 6,072,983 A | * | 6/2000 | Klosterman ..................... 725/49 |
| 6,111,612 A | | 8/2000 | Ozkan et al. |
| 6,157,411 A | * | 12/2000 | Williams et al. .............. 348/552 |
| 6,169,580 B1 | * | 1/2001 | Shin et al. ...................... 348/460 |
| 6,169,843 B1 | * | 1/2001 | Lenihan et al. ................. 386/46 |
| 6,208,643 B1 | * | 3/2001 | Dieterich et al. .............. 370/389 |
| 6,208,799 B1 | * | 3/2001 | Marsh et al. ..................... 386/83 |
| 6,292,624 B1 | * | 9/2001 | Saib et al. ........................ 386/83 |
| 6,305,018 B1 | | 10/2001 | Usui et al. |
| 6,311,011 B1 | * | 10/2001 | Kuroda ............................ 386/46 |
| 6,314,571 B1 | * | 11/2001 | Ogawa et al. ................... 725/48 |
| 6,324,694 B1 | * | 11/2001 | Watts et al. ................... 725/152 |
| 6,351,474 B1 | * | 2/2002 | Robinett et al. .............. 370/486 |
| 6,359,636 B1 | * | 3/2002 | Schindler et al. ............. 345/846 |
| 6,400,406 B1 | * | 6/2002 | Kim ................................ 348/460 |
| 6,427,238 B1 | * | 7/2002 | Goodman et al. ............. 725/136 |
| 6,518,986 B1 | * | 2/2003 | Mugura ......................... 345/810 |
| 6,529,526 B1 | | 3/2003 | Schneidewend |

FOREIGN PATENT DOCUMENTS

| | | |
|---|---|---|
| EP | 0 735 776 | 10/1996 |
| EP | 0 735 776 A2 | 10/1996 |
| EP | 0725542 | 7/2000 |
| JP | 1-190042 | 7/1989 |
| JP | 7-307931 | 11/1995 |
| JP | 8-214223 | 8/1996 |
| JP | 8-275077 | 10/1996 |
| JP | 9-44933 | 2/1997 |
| JP | 9-284665 | 10/1997 |
| JP | 10-136318 | 5/1998 |
| WO | 94/21081 | 9/1994 |
| WO | 96/36172 | 11/1996 |
| WO | WO97/04595 | 2/1997 |
| WO | 97/46010 | 12/1997 |
| WO | WO 97/46017 | 12/1997 |
| WO | WO 98/30023 | 7/1998 |

OTHER PUBLICATIONS

ATSC Standard, *Program and System Infromation Protocol for Terrestrial Broadcast Cable*, Nov. 10, 1997, Sec. 6.1 , pp. 14, 15, Annex A, pp. 48-49, Annex D, pp. 76-89.

Advanced Television Systems Committee: "Program and system information protocol for terrestrial broadcast and cable", PSIP Standard, Dec. 23, 1997, pp. 1-93, XP002129799.

(EPO Search Report Dated Feb. 7, 2000 Also Enclosed).

* cited by examiner

SYSTEM FOR PROCESSING PROGRAMS AND SYSTEM TIMING INFORMATION DERIVED FROM MULTIPLE BROADCAST SOURCES

This is a non-provisional application of provisional application Ser. No. 60/092,616 by D. R. Schneidewend et al, filed Jul. 13, 1998.

FIELD OF THE INVENTION

This invention is related to the processing of programs and associated content rating and system timing information received from multiple broadcast sources for program play, recording and playback.

BACKGROUND OF THE INVENTION

In digital video and audio broadcast applications, packetized program information transmitted to a video decoder, such as a High Definition Television (HDTV) receiver, contains broadcast channels, e.g. Fox 5™, Channel 13™, from multiple broadcasters. The packetized program information of an individual broadcaster may contain the data content of several program sub-channels occupying the frequency spectrum previously occupied by a single analog broadcast channel. The sub-channels may comprise, for example, digital services including a main program channel, a financial service channel offering stock quotes, a sports news service channel and a shopping and interactive channel, all being conveyed within the 6 MHz bandwidth previously allocated to a single analog NTSC compatible broadcast channel.

The packetized program information of an individual broadcaster also contains ancillary information as well as the data content of the program sub-channels. The ancillary information includes system information and program specific data used in identifying and assembling packets comprising selected programs and also includes program guide and text information associated with the transmitted program data. In particular, the ancillary system information includes system timing information providing a time clock reference enabling determination of a time at which a specific program is to be broadcast. The ancillary program specific data may include program content rating information (such as PG-13 etc.) enabling parental control of viewing using a conditional access system such as a V-chip type system, for example. The ancillary system timing and content rating information is typically encoded along with program data to conform to the requirements of a known standard. One such standard detailing an information protocol incorporating system timing and content rating information for broadcast applications is entitled, *Program and System Information Protocol for Terrestrial Broadcast and Cable*, published by the Advanced Television Systems Committee (ATSC), 10 Nov. 1997, hereinafter referred to as the PSIP standard.

A number of problems may arise in a digital video system in processing system timing and program specific information from multiple broadcast sources. Specifically, problems arise in the use of the system timing information for scheduling program processing functions and for displaying a current time to a user. Problems also arise in providing a conditional access system that uses accurate program content rating information in authorizing access to programs whilst also providing desirable features such as the ability for a user to optionally override a previously set content rating limit. Thus there is a need to solve these problems and derivative problems.

SUMMARY OF THE INVENTION

A system for initiating scheduled program processing functions such as program display, recording or playback, derives a time clock based on a current time reference indication produced by a particular broadcast source. The derived time clock is used in initiating scheduled processing functions for programs derived from the particular broadcast source and time clocks derived from sources other than the particular broadcast source are disregarded. The system may display a second time clock different to the derived time clock.

DETAILED DESCRIPTION OF THE DRAWINGS

Figure 1:
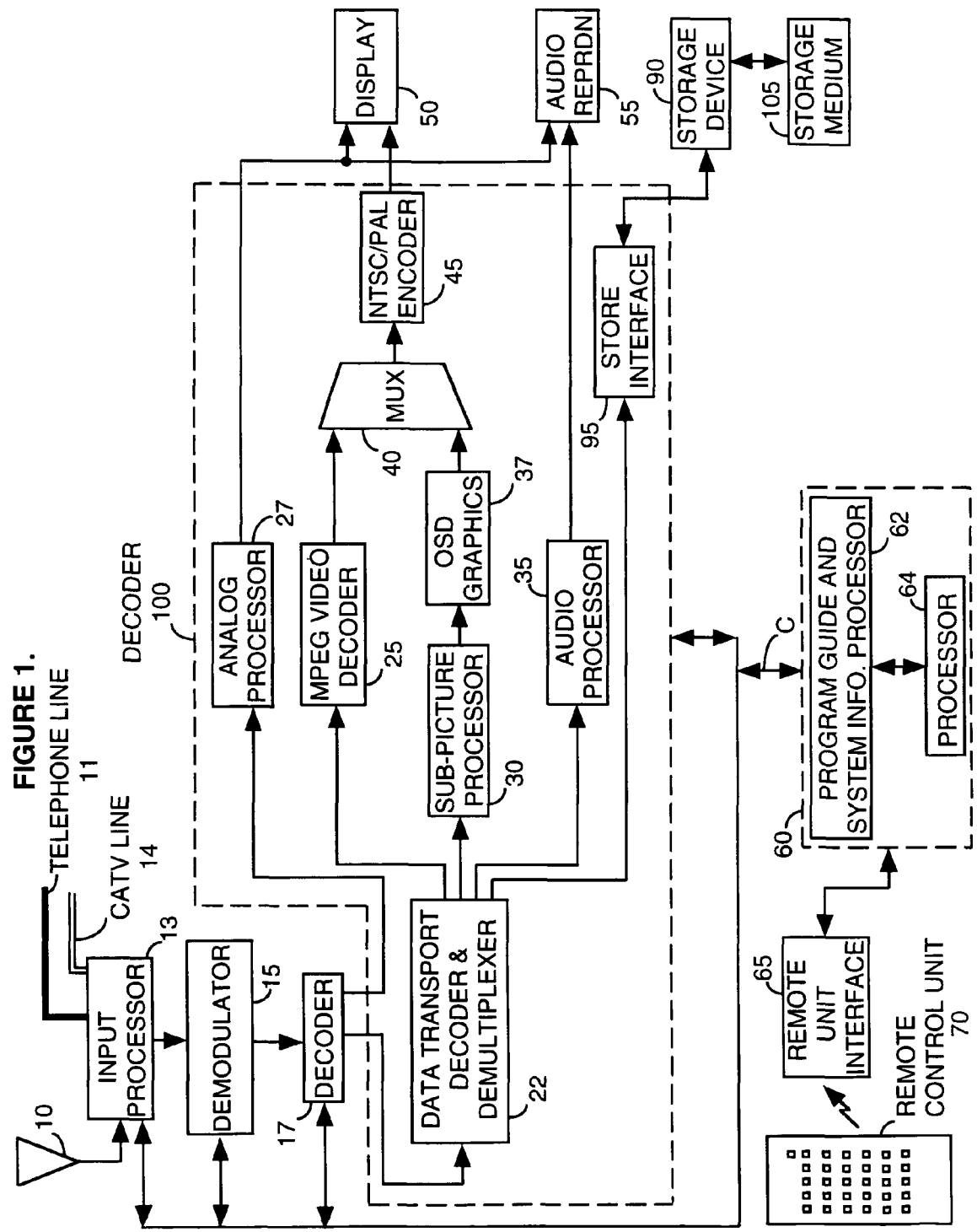
FIG. 1 is a block diagram of digital video receiving apparatus for processing system timing and program content rating information from multiple broadcast sources, according to the principles of the invention.

FIG. 1 is a block diagram of a digital video receiving system for demodulating and decoding broadcast signals from multiple broadcast sources, according to the principles of the invention. Although the disclosed system is described in the context of a system for receiving terrestrial broadcast video signals incorporating ancillary program specific and timing information in MPEG compatible format, it is exemplary only. The MPEG data format is widely adopted and detailed in the MPEG2 (Moving Pictures Expert Group) image encoding standard, hereinafter referred to as the "MPEG standard", (ISO/IEC 13818-1, 10 Jun. 1994, and ISO/IEC 13818-2, 20 Jan. 1995). The program specific and timing information may be of a variety of types. For example, it may comply with Program Specific Information (PSI) requirements specified in section 2.4.4 of the MPEG systems standard or it may comply with the previously mentioned PSIP standard or other ATSC standards. Alternatively, it may be formed in accordance with proprietary or custom requirements of a particular system.

The principles of the invention may be applied to terrestrial, cable, satellite, Internet or computer network broadcast systems in which the coding type or modulation format may be varied. Such systems may include, for example, non-MPEG compatible systems, involving other types of encoded datastreams and other methods of conveying program specific information. Further, although the disclosed system is described as processing broadcast programs, this is exemplary only. The term 'program' is used to represent any form of packetized data such as audio data, telephone messages, computer programs, Internet data or other communications, for example.

In the video receiver system of FIG. 1, a broadcast carrier modulated with signals carrying audio, video and associated data representing broadcast program content is received by antenna 10 and processed by unit 13. The resultant digital output signal is demodulated by demodulator 15. The demodulated output from unit 15 is trellis decoded, mapped into byte length data segments, deinterleaved and Reed-Solomon error corrected by decoder 17. The corrected output data from unit 17 is in the form of an MPEG compatible transport datastream containing program representative multiplexed audio, video and data components. The transport stream from unit 17 is demultiplexed into audio, video and data components by unit 22 which are further processed by the other elements of decoder system 100. In one mode, decoder 100 provides MPEG decoded data for display and audio reproduction on units 50 and 55 respectively. In another mode, the transport stream from unit 17 is processed by decoder 100 to provide an MPEG compatible datastream for storage on storage medium 105 via storage device 90.

A user selects for viewing either a TV channel (user selected channel-SC) or an on-screen menu, such as a program guide, by using a remote control unit 70. Controller 60 uses the selection information provided from remote control unit 70 via interface 65 to appropriately configure the elements of FIG. 1 to receive a desired program channel for viewing. Controller 60 comprises processor 62 and processor 64. Unit 62 processes (i.e. parses, collates and assembles) system timing information and program specific information including program content rating, and program guide information. Processor 64 performs the remaining control functions required in operating decoder 100. Although the functions of unit 60 may be implemented as separate elements 62 and 64 as depicted in FIG. 1, they may alternatively be implemented within a single processor. For example, the functions of units 62 and 64 may be incorporated within the programmed instructions of a microprocessor.

Controller 60 configures processor 13, demodulator 15, decoder 17 and decoder system 100 to demodulate and decode the input signal format and coding type. Further, controller 60 configures units 13, 15, and 17 for other communication modes, such as for receiving cable television (CATV) signals and for bi-directional communication via coaxial line 14 or for bi-directional (e.g. Internet) communication, for example, via telephone line 11. In an analog video mode, an NTSC compatible signal is received by units 13, 15 and 17 and processed by decoder 100 for video display and audio reproduction on units 50 and 55 respectively. Units 13, 15, 17 and sub-units within decoder 100 are individually configured for the input signal type by controller 60 setting control register values within these elements using a bi-directional data and control signal bus C.

The transport stream provided to decoder 100 comprises data packets containing program channel data and ancillary system timing information and program specific information including program content rating, and program guide information. Unit 22 directs the ancillary information packets to controller 60 which parses, collates and assembles this information into hierarchically arranged tables. Individual data packets comprising the User selected program channel SC are identified and assembled using the assembled program specific information. The system timing information contains a time reference indicator and associated correction data (e.g. a daylight savings time indicator and offset information adjusting for time drift, leap years etc.). This timing information is sufficient for a decoder to convert the time reference indicator to a time clock (e.g. United States east coast time and date) for establishing a time of day and date of the future transmission of a program by the broadcaster of the program. This time clock is useable for initiating scheduled program processing functions including program play, program recording and program playback, for example. Further, the program specific information contains conditional access, network information and identification and linking data enabling the system of FIG. 1 to tune to a desired channel and assemble data packets to form complete programs. The program specific information also contains ancillary program content rating information (e.g. an age based suitability rating), program guide information (e.g. an Electronic Program Guide—EPG) and descriptive text related to the broadcast programs as well as data supporting the identification and assembly of this ancillary information.

The program specific and system timing information is assembled by controller 60 into multiple hierarchically arranged and inter-linked tables. An exemplary PSIP compatible hierarchical table arrangement includes a System Time Table (STT), a Master Guide Table (MGT), a Channel Information Table (CIT), Event Information Tables (EITs) and optional tables such as Extended Text Tables (ETTs) and a Rating Region Table (RRT). The STT contains a time reference indicator and associated correction data sufficient for a decoder to establish a time of transmission of a program by a broadcast source accurate to within plus or minus seconds, for example. The MGT contains information for acquiring program specific information conveyed in other tables such as identifiers for identifying data packets associated with the other tables. The CIT contains information for tuning and navigation to receive a User selected program channel. The EIT contains descriptive lists of programs (events) receivable on the channels listed in the CIT. The ETT contains text messages describing programs and program channels.

The RRT contains program content rating information such as the MPAA (Motion Picture Association of America) or V-chip compatible rating information that is collated by region (e.g. by country or by state within the U.S.A.). Additional program specific information describing and supplementing items within the hierarchical tables is conveyed within descriptor information elements. Information associating a program content rating with a particular program from a particular broadcast source may be conveyed within a content advisory descriptor contained in an EIT or PMT. In other embodiments the system timing and program content rating information associating a specific program with a specific rating may be contained in other tables, data formats, or descriptors such as the caption service descriptor or the information may be conveyed in user definable data. Additional program content ratings are conveyed in vertical blanking intervals in NTSC compatible signals processed by analog processor 27 within decoder 100 in analog video mode. The program specific and system timing information acquired by controller 60 via unit 22 is stored within internal memory of unit 60. Controller 60 uses the acquired content rating and system timing information in conditioning access to programs and in scheduling program processing functions including program viewing, recording and playback.

Figure 2:
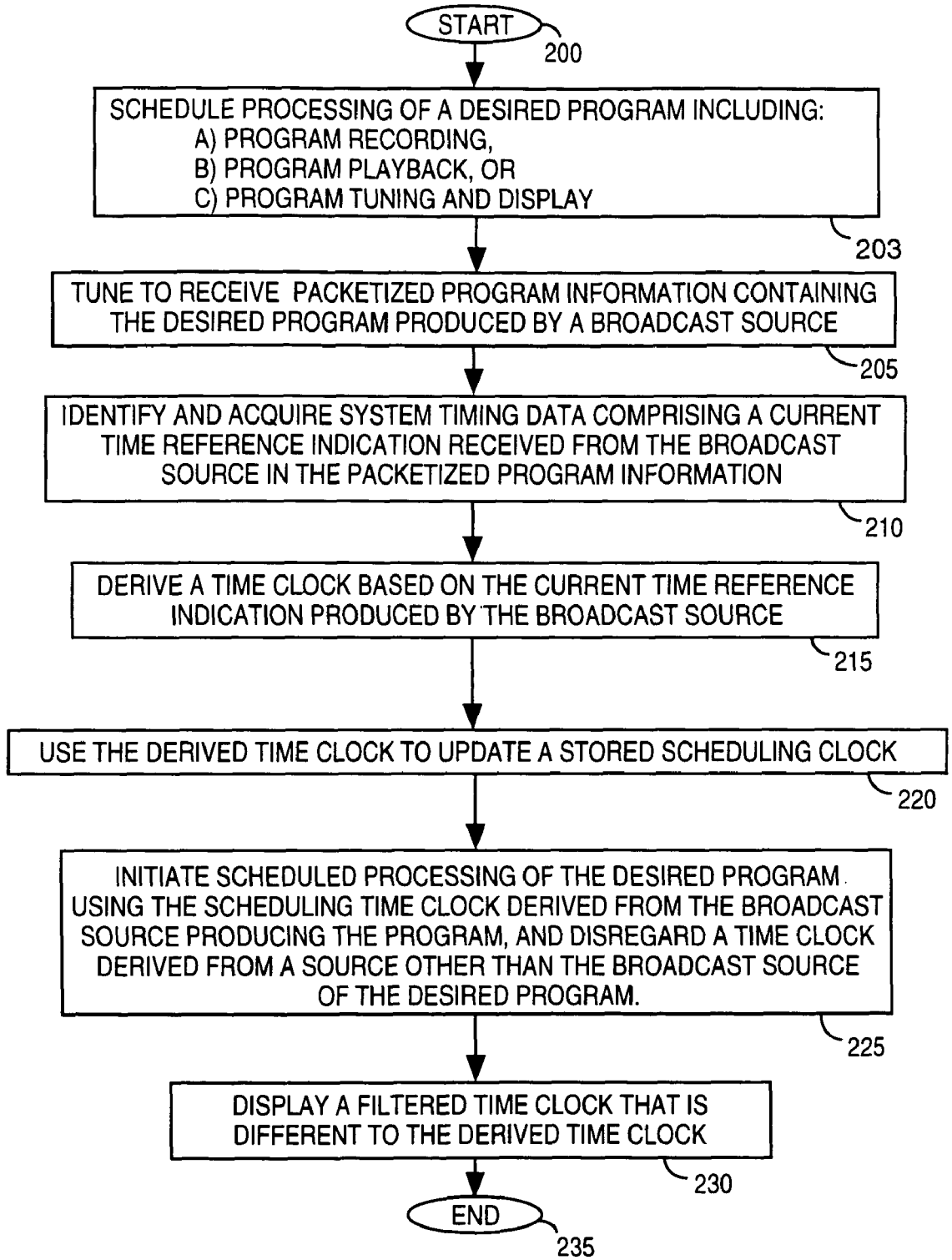
FIG. 2 shows a flowchart for a method for scheduling and executing program processing functions and displaying a time clock, according to the invention.

Controller 60 employs the process of FIG. 2 to execute scheduled program processing functions including program viewing, recording, and playback. In other embodiments, a process corresponding to the process of FIG. 2 (and FIG. 4) may be used to execute other scheduled functions including program transmission, program standards conversion, program encryption, decryption, scrambling, decoding and their derivative functions including the termination of any of these processing functions. In executing scheduled processing of a particular program, controller 60 adaptively generates a scheduling time clock from a time reference indication (e.g. in the STT) provided by the broadcast source of the particular program. This generated scheduling clock is used to time the initiation of scheduled program processing functions. Previously derived time clocks (e.g. from other broadcast sources) are disregarded in initiating scheduled processing of this particular program. The scheduling time clock is re-synchronized to the STT time reference information provided by a particular broadcast source prior to initiating scheduled processing of any programs produced by that particular source.

These features address the problem of preventing application of incorrect program specific information parameters (parameters within the MGT, CIT, EIT, ETT and RRT etc.) across program boundaries. This may occur if program processing is scheduled using an inaccurate time clock such as a clock derived from a broadcast source other than the source of the specific program to be processed. A time clock inaccuracy of 10 seconds or more is quite possible under these conditions due to program broadcasting delays and other delays occurring in a system using multiple broadcast sources.

As a result of this time clock inaccuracy, the wrong program may be recorded (or viewed or played back) in overlap periods between initiation or termination of program recording and the actual broadcast time of the program. Further, a program may be erroneously recorded using the program specific information parameters of a previously processed program during program segments occurring in the overlap periods. Consequently, upon playback of the program, incorrect program specific parameters are applied during the overlap segments. This may cause faulty decoding including incorrect packet identification and acquisition or the use of incorrect program content ratings, for example. As a result, invalid and objectionable images may be transiently displayed to a user. Under such conditions a portion of an adult content rated program may be erroneously displayed to a child, for example.

Controller 60 employs the process of FIG. 2 to schedule and execute program processing functions upon user initiation of a scheduling function. Following the start at step 200, controller 60 in step 203 schedules program viewing (including tuning and acquisition), recording or playback in response to a user scheduling command via the program guide interface of FIG. 3 displayed on display 50 (FIG. 1). Other embodiments may employ alternative user interfaces for this scheduling function.

Figure 3:
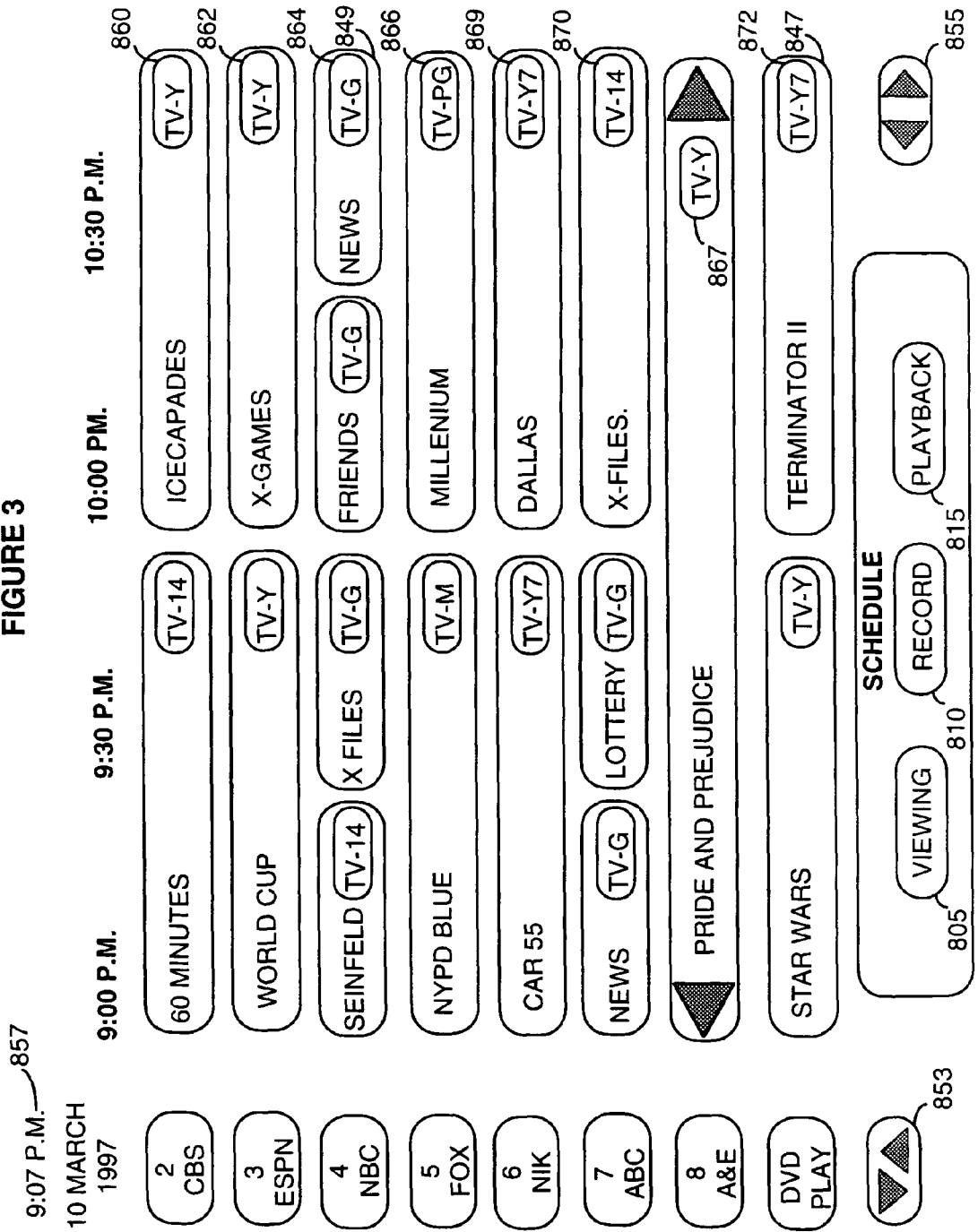
FIG. 3 shows a program guide user interface for initiating scheduling of program processing functions, according to the invention.

In scheduling program viewing or recording via the program guide of FIG. 3, a user navigates to the desired channel and program using menu icons 853 and 855. The user selects a program e.g. news program 849 by highlighting the news icon 849 and schedules the news program 849 for viewing or recording by selecting icon 805 or icon 810 respectively. A user may similarly schedule playback of a movie such as movie item 847 (Terminator II) from storage device 90 and medium 105 (FIG. 1). The user schedules playback of the movie by highlighting the movie item 847 and selecting icon 815. In other embodiments a user may schedule program viewing, recording or playback by other methods such as by using remote unit 70 buttons rather than program guide icons 805, 810 and 815.

Upon user selection of icons 805 or 810 controller 60 stores the scheduled times of broadcast and termination of news item 849 in internal memory. Controller 60 determines scheduled times of broadcast and termination of news item 849 from stored program guide information previously derived from the EIT. Upon user selection of icon 815 controller 60 in conjunction with unit 37 (FIG. 1) generates a scheduling menu enabling a user to enter a time for future playback of movie 847 or to select immediate playback of the movie. A user selects the control and navigation icons and enters times etc. using remote control 70 which supports cursor manipulation (or an alternative cursor based arrangement such as a mouse or keyboard system).

Returning to the process of FIG. 2, controller 60 in step 205 configures units 13, 15 and 17 (FIG. 1) and decoder 100 elements to receive packetized program information containing a user selected program. Controller 60 configures processor 13, demodulator 15 and decoder 17 to receive the specific channel frequency and data format of the transmission channel of the broadcaster of the desired program (previously selected in step 203). In step 210 controller 60 acquires the packets comprising STT data from the broadcast source of the desired program by configuring demultiplexer 22 with the predetermined STT PIDs and table identification data (Table_ID). Thereby controller 60 acquires the STT data containing a current time reference indication and time correction data produced by the broadcast source of the desired program. The STT data is transmitted and acquired at predetermined periodic intervals (recommended by the PSIP standard to be at least once per second).

In step 215, in program recording and viewing modes, controller 60 derives a time clock using the acquired STT time reference indication (a value indicating the number of seconds elapsed since a base time, specifically since 12 a.m. Jan. 6, 1980) together with STT correction data including an offset value and daylight savings time indicator (per PSIP standard section 6.1). The derived time clock consists of both a date and time and comprises year, month, day and time of day. In deriving the time clock from the time reference indication the following four values are computed:

Number of minutes from Base=(received seconds from Base)/60   1)

Number of hours from Base=(received minutes from Base)/60   2)

Number of days from Base=(hours from Base)/24   3)

Number of years from Base=(days from Base)/(days per year), where, days per year=365, or 366 in a leap year   4)

Note,

The Base in the above expressions is 12 a.m. Jan. 6, 1980. From the above four values the derived time clock components, year, month, day and time of day are determined as follows.

current year=Base year+number of years from Base,   1)

current day of year=number of days from Base−(number of years from Base*days per year),   2)

Also, the current month and day of the month are determined directly from the current year and the current day of year.

current hour of day=number of hours from Base−(number of days from Base*24),   3)

current minute of hour=number of received minutes from Base−(number of hours from Base*60)   4)

current second within the minute=number of received seconds from Base−(number of minutes from Base*60)   5)

Then the derived time clock is the current total time=current year, month, day, hour, minute and second. In addition, the derived time clock is corrected using STT correction data including an offset value and daylight savings time indicator per PSIP standard section 6.1 and Annex A (or by corresponding correction factors in non-PSIP compatible systems).

In step 215 in program playback mode, controller 60 uses an internal system clock synchronized with operation of storage device 90 for initiation of movie playback. In other embodiments, controller 60 may derive a scheduling clock from a variety of other forms of time clock data. It is advantageous that the time clock data used to derive the scheduling clock is synchronized with the time clock transmitted by the broadcast source in broadcasting the desired program. This is achieved, for example, by using STT data from the broadcast source of the desired program in viewing and recording modes and by using a system clock synchronized with a playback device in playback mode. STT data and time clocks derived from STT data from broadcast sources other than the source of the desired program are disregarded in initiating scheduled processing of the desired program.

In step 220, controller 60 updates (i.e. corrects and re-synchronizes) an internally maintained and stored scheduling time clock with the time clock information derived in step 215. The scheduling clock is periodically updated in this manner from derived time clock values obtained from the updated STT data received at intervals of one second or less. In the time intervals between updating the scheduling clock from the STT data the scheduling clock is maintained using an internal crystal derived clock frequency within controller 60. Controller 60 in other embodiments may create and maintain separate scheduling clocks and/or STT derived time reference and correction information associated with each program broadcast source (e.g. one clock for each broadcast source) using the method of steps 205-215. In step 220, if no time clock reference information is available from the broadcast source of the desired program, controller 60 uses a previously derived scheduling clock. Controller 60 in step 225 initiates processing of the desired program at the scheduled processing time previously established in step 203. Controller 60 determines whether the times for initiating processing (previously scheduled in step 203) have arrived based on the scheduled clock determined in step 220.

Controller 60 in step 225 initiates processing of the desired program for viewing, recording or playback at the scheduled processing time by identifying and acquiring the packets comprising the desired program. Specifically, controller 60 and processor 22 (FIG. 1) determine from the CIT the PIDs of video, audio and sub-picture streams in the packetized decoded transport stream input to decoder 100 from unit 17. The video, audio and sub-picture streams constitute the desired program being transmitted on selected channel SC. Processor 22 provides MPEG compatible video, audio and sub-picture streams for to video decoder 25, audio decoder 35 and sub-picture processor 30 respectively. The video and audio streams contain compressed video and audio data representing the selected channel SC program content. The sub-picture data contains the EIT, ETT and RRT information associated with the channel SC program content.

Decoder 25 decodes and decompresses the MPEG compatible packetized video data from unit 22 and provides decompressed program representative pixel data to NTSC encoder 45 via multiplexer 40. Similarly, audio processor 35 decodes the packetized audio data from unit 22 and provides decoded and amplified audio data, synchronized with the associated decompressed video data, to device 55 for audio reproduction. Processor 30 decodes and decompresses sub-picture data received from unit 22.

Processor 30 assembles, collates and interprets EIT, RRT, and ETT data from unit 22 to produce formatted program guide data for output to OSD 37. OSD 37 processes the EIT, RRT and ETT and other information to generate pixel mapped data representing subtitling, control and information menu displays including selectable menu options and other items for presentation on the display device 50. The control and information menus that are displayed enable a user to select a program to view and to schedule future program processing functions including a) tuning to receive a selected program for viewing, b) recording of a program onto storage medium 105, and c) playback of a program from medium 105.

The control and information displays, including text and graphics produced by OSD generator 37, are generated in the form of overlay pixel map data under direction of controller 60. The overlay pixel map data from unit 37 is combined and synchronized with the decompressed pixel representative data from MPEG decoder 25 in encoder 45 via multiplexer 40 under direction of controller 60. Combined pixel map data representing a video program on channel SC together with associated sub-picture data is encoded by NTSC encoder 45 and output to device 50 for display.

In step 230 (FIG. 2), controller 60 generates a second time clock for presentation to a user such as the displayed time clock item 857 (also comprising a date) depicted in the program guide of FIG. 3, for example. The second time clock is different to the scheduling clock and is generated to prevent time change discontinuities that occur in the scheduling clock from being displayed and from disturbing a user. Controller 60 generates the second time clock a) by filtering the scheduling time clock values to prevent abrupt discontinuities e.g. by using a low pass filter, or b) by updating the second time clock in periods when it is not visible to a user. Alternatively, a second time clock may be used that is independent of the scheduling clock and is a) based on an internal clock of the controller 60 and decoder 100 system, b) is received on a channel that is separate and distinct from the program content channels, or c) is received embedded within a composite program guide that lists programs from multiple broadcast sources, for example. The process of FIG. 2 terminates at step 235.

Figure 4:
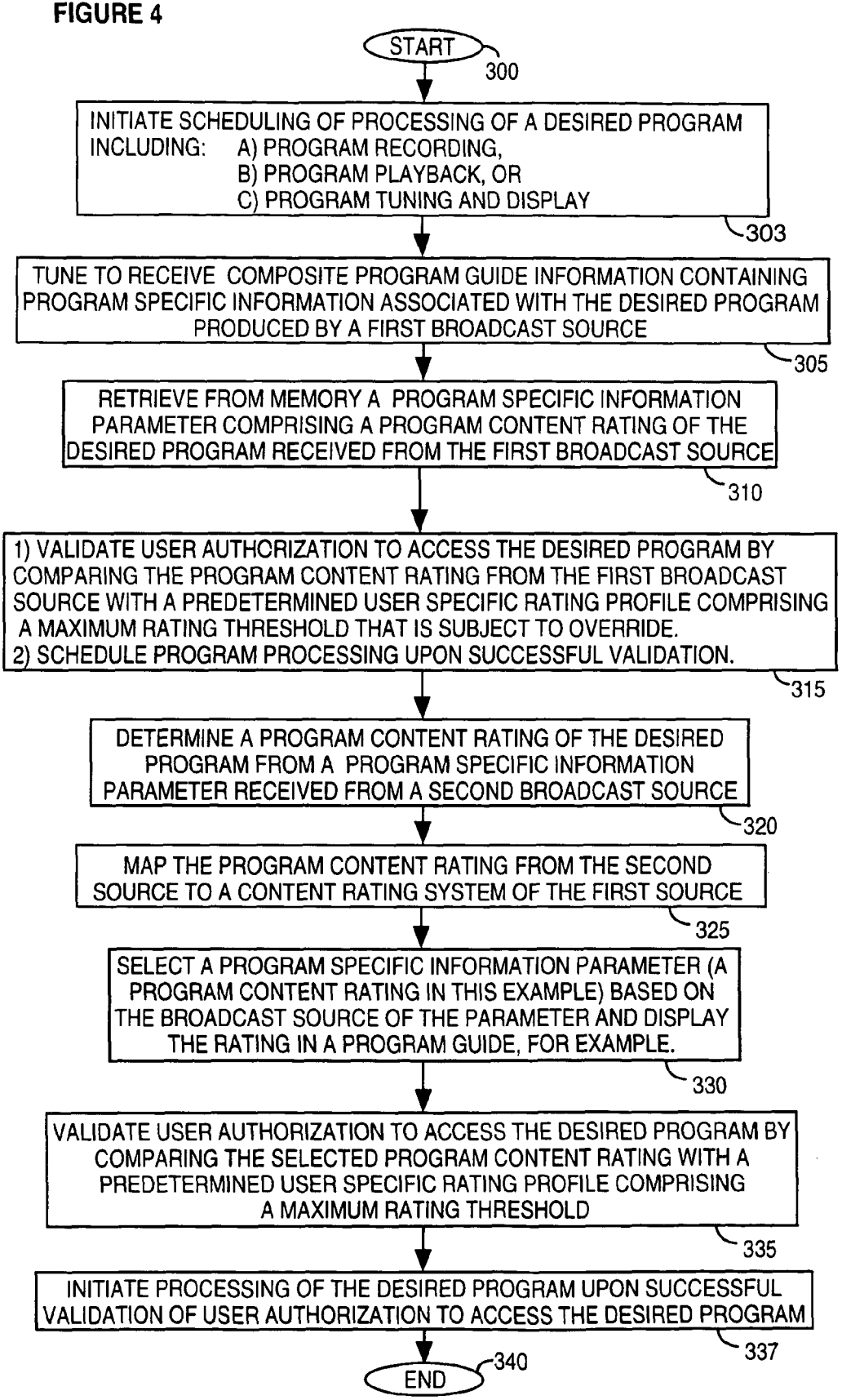
FIG. 4 shows a flowchart for a method for conditioning access to programs based on program content ratings received from multiple broadcast sources, according to the invention.

Controller 60 employs the method of FIG. 4 to process packetized program information from different broadcast sources using functionally equivalent program specific information parameters including program content rating data dynamically selected from alternative broadcast sources. In processing packetized program information, controller 60 advantageously adaptively selects a program specific parameter based on the broadcast source of the parameter. The process of FIG. 4 is also applicable to the scheduling of analog video NTSC compatible programs and to the acquisition and processing of rating information derived from vertical blanking intervals.

In the exemplary embodiment of FIG. 4, controller 60 conditions access to programs based on program content ratings received from multiple broadcast sources that provide either analog or digital data. Controller 60 conditions access to programs in response to user commands entered via control and information menus generated by OSD unit 37 and displayed on unit 50 (as described in connection with FIG. 2). The control and information menus enable a user to enter content rating profiles for himself and others, upon providing entitlement data comprising a userid and a predetermined password, for example. A content rating profile allows a user to set a maximum rating limit threshold for individual users of decoder 100 according to a user selected rating system. A user may select rating limit thresholds according to one of a number of different rating systems such as the V-chip, MPAA, or other systems. Thereby decoder 100 enables parental control over access to broadcast programs by children and others. In addition, the control and information menus enable a user to override a selected preset maximum rating limit upon entry of authorization data such as a userid and password.

In executing the process of FIG. 4 and following the start at step 300, controller 60 in step 303 initiates scheduling of program viewing (including tuning and acquisition), recording or playback. Controller 60 initiates scheduling in response to a user scheduling command via the program guide interface of FIG. 3 as previously discussed. Controller 60 in step 305 configures units 13, 15 and 17 (FIG. 1) and decoder 100 elements to receive composite program guide information from a first broadcast source. The composite program guide information contains program description and other information supporting assembly and decoding of packet data constituting individual programs produced by multiple different broadcast sources. Controller 60 configures processor 13, demodulator 15 and decoder 17 to receive the specific channel frequency and data format of the transmission channel provided by the first broadcast source. Thereby in step 305 controller 60, in conjunction with unit 22, acquires composite program guide information containing program specific information including a program content rating for the desired program from the first broadcast source. Also, in step 305 controller 60 stores the program specific information in internal memory and in step 310 retrieves the content rating of the desired program from a content advisory descriptor contained in an EIT of the stored program specific information. Controller 60 determines the rating system of the retrieved content rating (i.e. whether the desired program is rated according to a V-chip or MPAA compatible system, for example) from an acquired RRT of the stored program specific information.

In step 315, controller 60 compares the retrieved program content rating with a maximum rating threshold limit contained in a predetermined user specific rating profile. The rating threshold limit determines the maximum program content rating that the present user of the decoder 100 system is authorized to access. If the content rating of the desired program does not exceed the maximum content rating threshold, controller 60 schedules processing of the desired program in step 315. The retrieved program content rating and maximum content rating threshold limit are compatible with a content rating system contained within the previously stored RRT. An exemplary age based rating system is depicted in the program guide of FIG. 3 (items 860-872) and comprises TV-M, TV-14, TV-PG, TV-G, TV-Y7, TV-Y ratings.

A number of problems may occur in using content ratings from a composite program guide (or another rating information source) in scheduling processing of programs in the manner disclosed in steps 303-315. Specifically, problems may arise because a) the content rating supplied in the composite guide provided by the first broadcast source may be inaccurate, and b) the verification of user authorization performed in step 315 may be rendered invalid for a variety of reasons. The verification may be rendered invalid, for example, because either the program guide limit threshold is subsequently overridden and altered by an authorized user or because of a subsequent re-rating of the content of the desired program.

Consequently, controller 60 in step 320 acquires a second content rating of the desired program from program specific information provided by the broadcast source of the desired program. The content rating from this second broadcast source is acquired reasonably close to the time of program broadcast to enable a current and reliable second validation of user authorization to access the desired program. In step 325, controller 60 converts the content rating acquired from the second source (the broadcaster of the desired program) to be compatible with the content rating system used by the first source (the composite guide broadcaster). Controller 60 converts the content rating using predetermined equivalence mapping information for mapping content ratings of one broadcast source to a rating system of another source.

In step 330, if the ratings acquired from the first and second broadcast sources are different, controller 60 selects between them. Once selected, the content rating is used in further processing and may be used by controller 60 in step 330 to update an existing different rating such as a rating displayed in the program guide of FIG. 3, for example. Controller 60, in step 330, selects a program specific information parameter from the broadcast source deemed to be the most reliable and accurate considering a) the type of parameter being selected (a content rating in this example), and b) the time and stage in the processing scheme at which the parameter is being processed. A program specific information parameter from one broadcast source may be deemed more reliable at a particular point in time than an equivalent parameter from another source. Consequently, parameter selection may be advantageously varied based on the source of the parameter and time and processing stage at which it is acquired. In other embodiments, the rating conversion step 325 may be unnecessary and it may alternatively be used to convert a rating to the system of the second source or to a third and different system. It is advantageous in conditioning access based on program content ratings to select the content rating that: a) is provided from the broadcast source of the desired program, and b) is the most recently acquired rating especially if the rating is acquired substantially close to the time of broadcast of the desired program.

In step 335, controller 60 uses the rating selected in step 330 to perform a second validation of user authorization to access the desired program in the manner described in connection with step 315. Specifically, controller 60 compares the retrieved program content rating with the maximum rating threshold limit contained in the predetermined user specific rating profile. Upon successful validation, controller 60 in step 337 initiates processing of the desired program by configuring demultiplexer 22 with the PIDs for identifying and acquiring the packets comprising the datastreams constituting the desired program. Decoder 100 processes the identified packets of the desired program for viewing, recording or playback in the manner previously described in connection with FIG. 2. The process of FIG. 4 terminates at step 340.

The process of FIG. 4 is also used in conditioning access to analog video programs and in the acquisition and processing of program content ratings derived from the vertical blanking intervals of NTSC compatible analog video signals. Consequently steps 303-320 similarly involve scheduling analog video processing and tuning to analog video sources for deriving content ratings (e.g. V-chip compatible ratings) from NTSC compatible vertical or horizontal blanking intervals. Further, the mapping, selection, validation and processing of steps 325-337 use ratings derived from analog video signal as well as from digital program specific information.

Figure 5:
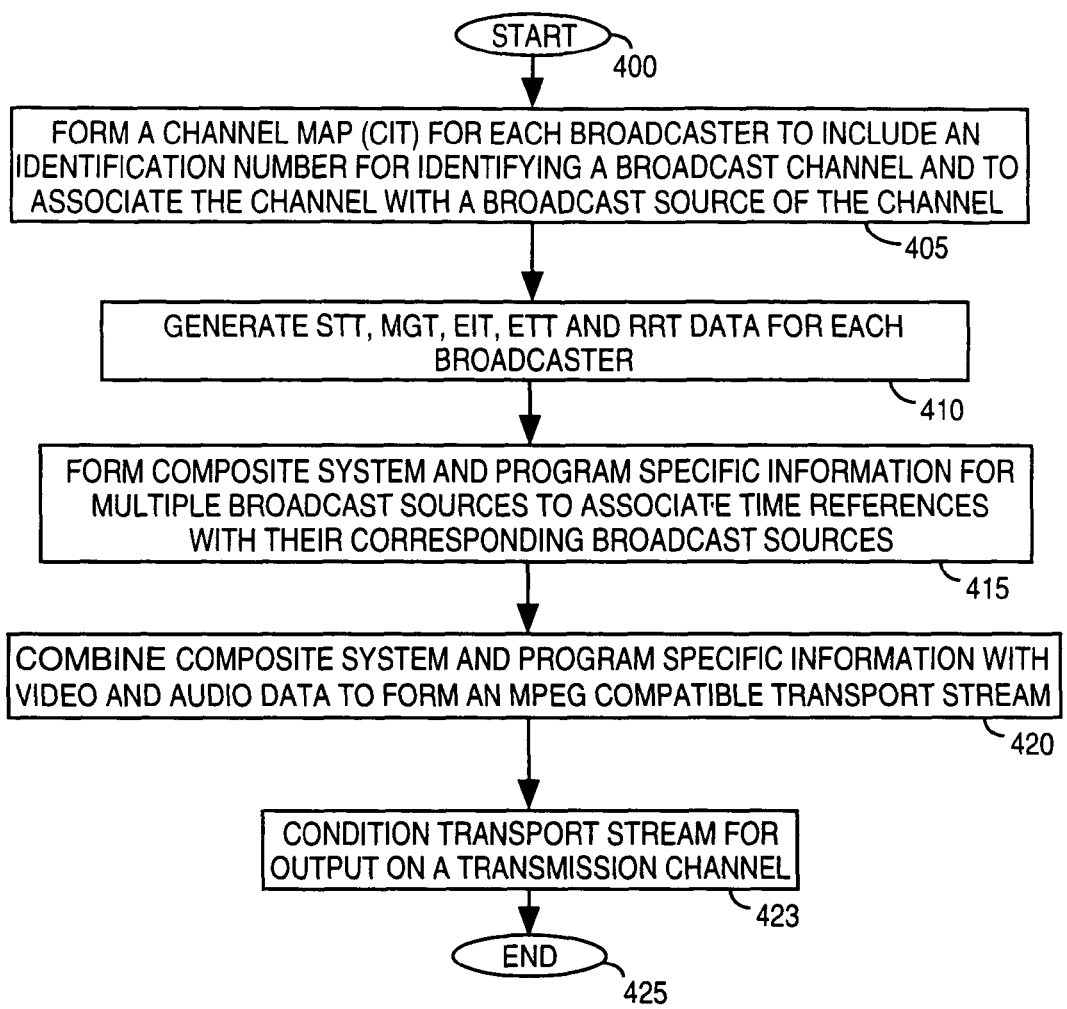
FIG. 5 shows a method for generating program specific information incorporating system timing and program content rating information, according to the invention.

FIG. 5 shows a method for generating program specific information incorporating system timing and program content rating information, according to the invention. The method may be employed at an encoder for broadcasting video data such as the data received by antenna 10 of FIG. 1 or the method may be employed within a decoder unit such as within controller 60 of FIG. 1 in a storage mode, for example.

In a storage mode of the system of FIG. 1, the corrected output data from unit 17 is processed by decoder 100 to provide an MPEG compatible datastream for storage. In this mode, a program is selected for storage by a user via remote unit 70 and interface 65. Processor 22, in conjunction with controller 60 forms condensed system and program specific information including STT, MGT, CIT, EIT, ETT and RRT data containing the advantageous features previously described. The condensed information supports decoding of the program selected for storage but excludes unrelated information. Controller 60, in conjunction with processor 22 forms a composite MPEG compatible datastream containing packetized content data of the selected program and associated condensed program specific information. The composite datastream is output to storage interface 95.

Storage interface 95 buffers the composite datastream to reduce gaps and bit rate variation in the data. The resultant buffered data is processed by storage device 90 to be suitable for storage on medium 105. Storage device 90 encodes the buffered datastream from interface 95 using known error encoding techniques such as channel coding, interleaving and Reed Solomon encoding to produce an encoded datastream suitable for storage. Unit 90 stores the resultant encoded datastream incorporating the condensed program specific information on medium 105.

An encoder employs the method of FIG. 5 for generating system and program specific information including STT, MGT, CIT, EIT, ETT and RRT data and descriptors for each broadcaster and for combining the information in a composite datastream. The generated information may be transmitted to a decoder system such as the system of FIG. 1 for reception by antenna 10 and subsequent decoding as previously described for example. Following the start at step 400 of FIG. 5, STT, MGT, CIT, EIT, ETT and RRT data and descriptors for each broadcaster is generated in steps 405 and 410. Specifically, a CIT is generated in step 405. The CIT contains channel and program identification information enabling acquisition of available broadcast programs and channels produced by an individual broadcaster. The CIT incorporates channel identification numbers and packet identifiers for identifying individual packetized datastreams that constitute individual programs to be transmitted on particular channels. The generated CIT also incorporates items linked to listed program channels including a program number, a language code indicator, and a stream type identifier, as previously described in connection with FIG. 1.

In step 410, an EIT is generated containing program guide information including descriptive lists of programs (events) receivable on the channels listed in the CIT. The EIT is generated to include a content advisory descriptor containing program content ratings selected and processed from rating information provided by multiple broadcast sources in the manner described in connection with FIG. 4. The EIT associates a specific program with a specific rating. An ETT and an RRT are also generated in step 410. The ETT contains text messages describing programs, for example, and the RRT contains program content rating information for various rating systems as previously described. In step 410, an MGT is also generated containing data identifiers enabling the identification and assembly of CIT, EIT, and RRT information. The MGT also conveys table size information for the previously generated CIT, EIT, ETT and RRT. An STT is also generated in step 410 containing a time reference indicator and associated correction data sufficient for a decoder to establish a time of transmission of a program by the program broadcaster.

In step 415, the STT, MGT, CIT, EIT, ETT and RRT data and descriptors generated for each broadcaster in steps 405 and 410 are formed into composite system and program specific information for multiple broadcast sources. The composite system and program specific information is advantageously formed to associate individual STT time references with their corresponding broadcast sources. In step 420, the composite information produced in step 415 is combined with video and audio program representative components for multiple channels and is formatted into a transport stream for output. In step 423, the output transport stream is further processed to be suitable for transmission to another device such as a receiver, video server, or storage device for recording on a storage medium, for example. The processes performed in step 423 include known encoding functions such as data compression Reed-Solomon encoding, interleaving, scrambling, trellis encoding, and carrier modulation. The process is complete and terminates at step 425. In the process of FIG. 5, multiple CIT, EIT, ETT and RRT tables may be formed and incorporated in the program specific information in order to accommodate expanded numbers of channels.

The architecture of FIG. 1 is not exclusive. Other architectures may be derived in accordance with the principles of the invention to accomplish the same objectives. Further, the functions of the elements of decoder 100 of FIG. 1 and the process steps of FIGS. 2, 4 and 5 may be implemented in whole or in part within the programmed instructions of a microprocessor. In addition, the principles of the invention apply to any form of MPEG or non-MPEG compatible electronic program guide. A datastream formed according to the invention principles may be used in a variety of applications including video server or PC type communication via telephone lines, for example. A program datastream with one or more components of video, audio and data formed to incorporate system and program specific information according to invention principles may be recorded on a storage medium and transmitted or re-broadcast to other servers, PCs or receivers.

What is claimed is:
1. A method comprising:
receiving selection of (1) a first program from a first program source, (2) a second program from a second program source, (3) a first program processing function for the first program, and (4) a second program processing function for the second program;
synchronizing, prior to initiating the first program processing function, (1) a first running elapsed scheduling time clock that provides a current running elapsed time of day indicating an amount of time that has already elapsed and used for determining when a scheduled start time in the future occurs for the first program processing function, to (2) a current running elapsed time of day indicating an amount of time that has already elapsed at the first program source;
comparing the synchronized first running elapsed scheduling time clock to the scheduled start time for the first program processing function, as time indicated by the synchronized first running elapsed scheduling time clock gets closer to the scheduled start time for the first program processing function, in order to determine when to initiate the first program processing function;
initiating the first program processing function based on the comparing of the synchronized first running elapsed scheduling time clock and the scheduled start time for the first program processing function;

synchronizing, prior to initiating the second program processing function, (1) a second running elapsed scheduling time clock that provides a current running elapsed time of day indicating an amount of time that has already elapsed and used for determining when a scheduled start time in the future occurs for the second program processing function, to (2) a current running elapsed time of day indicating an amount of time that has already elapsed at the second program source;

comparing the synchronized second running elapsed scheduling time clock to the scheduled start time for the second program processing function, as time indicated by the synchronized second running elapsed scheduling time clock gets closer to the scheduled start time for the second program processing function, in order to determine when to initiate the second program processing function; and initiating the second program processing function based on the comparing of the synchronized second running elapsed scheduling time clock and the scheduled start time for the second program processing function.

2. The method of claim 1 further comprising simultaneously maintaining, for at least a period of time, both (1) the synchronized first running elapsed scheduling time clock, and (2) the synchronized second running elapsed scheduling time clock.

3. The method of claim 1 wherein the first programming processing function comprises at least one from a group consisting of display, record, and playback.

4. The method of claim 3 wherein the group further comprises: program transmission, program standards conversion, program encryption, program decryption, program scrambling, and program decoding.

5. The method of claim 1 further comprising terminating the second program processing function based on the synchronized second running elapsed scheduling time clock.

6. The method of claim 1 wherein the current running elapsed time of day indicating the amount of time that has already elapsed at the first program source comprises System Time Table (STT) data of an MPEG compliant data stream.

7. The method of claim 1 further comprising receiving (1) the current running elapsed time of day indicating the amount of time that has already elapsed at the first program source, and (2) the current running elapsed time of day indicating the amount of time that has already elapsed at the second program source.

8. A receiving system comprising a processor, the processor programmed:
to provide a guide operable by a user (1) to select a first program from a first program source, (2) to select a second program from a second program source, (3) to select a first program processing function for the first program, and (4) to select a second program processing function for the second program;
to synchronize, prior to initiating the first program processing function, (1) a first running elapsed scheduling time clock that provides a current running elapsed time of day indicating an amount of time that has already elapsed and used for determining when a scheduled start time in the future occurs for the first program processing function, to (2) a current running elapsed time of day indicating an amount of time that has already elapsed at the first program source;
to compare the synchronized first running elapsed scheduling time clock to the scheduled start time for the first program processing function, as time indicated by the synchronized first running elapsed scheduling time clock gets closer to the scheduled start time for the first program processing function, in order to determine when to initiate the first program processing function;
to initiate the first program processing function based on the comparing of the synchronized first running elapsed scheduling time clock and the scheduled start time for the first program processing function;
to synchronize, prior to initiating the second program processing function, (1) a second running elapsed scheduling time clock that provides a current running elapsed time of day indicating an amount of time that has already elapsed and used for determining when a scheduled start time in the future occurs for the second program processing function, to (2) a current running elapsed time of day indicating an amount of time that has already elapsed at the second program source;
to compare the synchronized second running elapsed scheduling time clock to the scheduled start time for the second program processing function, as time indicated by the synchronized second running elapsed scheduling time clock gets closer to the scheduled start time for the second program processing function, in order to determine when to initiate the second program processing function; and
to initiate the second program processing function based on the comparing of the synchronized second running elapsed scheduling time clock and the scheduled start time for the second program processing function.

9. The system of claim 8 wherein the processor is programmed to simultaneously maintain, for at least a period of time, both (1) the synchronized first running elapsed scheduling time clock, and (2) the synchronized second running elapsed scheduling time clock.

10. The system of claim 8 wherein the processor is programmed to terminate the second program processing function based on the synchronized second running elapsed scheduling time clock.

11. The system of claim 8 wherein the current running elapsed time of day indicating the amount of time that has already elapsed at the first program source comprises System Time Table (STT) data of an MPEG compliant data stream.

12. The system of claim 8 wherein:
the processor is further programmed to receive (1) the current running elapsed time of day indicating the amount of time that has already elapsed at the first program source, and (2) the current running elapsed time of day indicating the amount of time that has already elapsed at the second program source.

13. A non-transitory computer readable storage medium comprising programmed instructions for performing at least the following:
receiving selection of (1) a first program from a first program source, (2) a second program from a second program source, (3) a first program processing function for the first program, and (4) a second program processing function for the second program;
synchronizing, prior to initiating the first program processing function, (1) a first running elapsed scheduling time clock that provides a current running elapsed time of day indicating an amount of time that has already elapsed and used for determining when a scheduled start time in the future occurs for the first program processing function, to (2) a current running elapsed time of day indicating an amount of time that has already elapsed at the first program source;

comparing the synchronized first running elapsed scheduling time clock to the scheduled start time for the first program processing function, as time indicated by the synchronized first running elapsed scheduling time clock gets closer to the scheduled start time for the first program processing function, in order to determine when to initiate the first program processing function;

initiating the first program processing function based on the comparing of the synchronized first running elapsed scheduling time clock and the scheduled start time for the first program processing function;

synchronizing, prior to initiating the second program processing function, (1) a second running elapsed scheduling time clock that provides a current running elapsed time of day indicating an amount of time that has already elapsed and used for determining when a scheduled start time in the future occurs for the second program processing function, to (2) a current running elapsed time of day indicating an amount of time that has already elapsed at the second program source;

comparing the synchronized second running elapsed scheduling time clock to the scheduled start time for the second program processing function, as time indicated by the synchronized second running elapsed scheduling time clock gets closer to the scheduled start time for the second program processing function, in order to determine when to initiate the second program processing function; and initiating the second program processing function based on the comparing of the synchronized second running elapsed scheduling time clock and the scheduled start time for the second program processing function.

14. The storage non-transitory computer readable medium of claim 13 wherein:

the programmed instructions are further for performing simultaneously maintaining, for at least a period of time, both (1) the synchronized first running elapsed scheduling time clock, and (2) the synchronized second running elapsed scheduling time clock.

15. The non-transitory computer readable storage medium of claim 13 wherein:

the programmed instructions are further for performing receiving (1) the current running elapsed time of day indicating the amount of time that has already elapsed at the first program source, and (2) the current running elapsed time of day indicating the amount of time that has already elapsed at the second program source.

* * * * *